(12) United States Patent
Andersen et al.

(10) Patent No.: US 8,197,215 B2
(45) Date of Patent: Jun. 12, 2012

(54) DRIVE TRAIN FOR A WIND TURBINE

(75) Inventors: Carsten Bruun Andersen, Århus V (DK); Steffen Haslev Sorensen, Hinnerup (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/809,887

(22) PCT Filed: Dec. 18, 2008

(86) PCT No.: PCT/EP2008/067917
§ 371 (c)(1),
(2), (4) Date: Sep. 22, 2010

(87) PCT Pub. No.: WO2009/080712
PCT Pub. Date: Jul. 2, 2009

(65) Prior Publication Data
US 2011/0142598 A1     Jun. 16, 2011

Related U.S. Application Data

(60) Provisional application No. 61/015,737, filed on Dec. 21, 2007.

(30) Foreign Application Priority Data

Dec. 21, 2007   (DK) ................................ 2007 01850

(51) Int. Cl.
*F03D 11/02*    (2006.01)
(52) U.S. Cl. ............... 416/170 R; 416/174; 416/244 R; 415/4.2; 415/4.4; 415/229

(58) Field of Classification Search ............. 416/170 R, 416/174, 244 R; 415/4.2, 4.4, 229
See application file for complete search history.

(56) References Cited

U.S. PATENT DOCUMENTS

| | | | |
|---|---|---|---|
| 6,232,673 B1 * | 5/2001 | Schoo et al. | 290/55 |
| 6,459,165 B1 * | 10/2002 | Schoo | 290/44 |
| 7,011,598 B2 | 3/2006 | Flamang et al. | |
| 7,335,128 B2 | 2/2008 | Flamang et al. | |
| 7,397,145 B2 | 7/2008 | Struve et al. | |
| 7,600,964 B2 * | 10/2009 | Rogall et al. | 415/4.5 |

(Continued)

FOREIGN PATENT DOCUMENTS

DE    202004007831 U1    7/2004

(Continued)

OTHER PUBLICATIONS

International Search Report dated Jan. 20, 2010.

(Continued)

*Primary Examiner* — Igor Kershteyn
(74) *Attorney, Agent, or Firm* — Wood, Herron & Evans, L.L.P.

(57) ABSTRACT

A drive train for a wind turbine, comprising a main bearing arrangement in the form of a single locating bearing arranged to support a main shaft. An outer raceway of the main bearing is coupled to a support structure, such as a base frame of a nacelle, via flange parts arranged on the outer raceway and the support structure, respectively. The flange parts define interfacing surfaces extending in a plane which is arranged non-parallel, preferably substantially perpendicular, to the rotational axis of the main shaft. Thereby a service friendly design is obtained, in which the main bearing and/or the main shaft can be repaired and/or replaced without having to remove the rotor from the nacelle.

23 Claims, 4 Drawing Sheets

U.S. PATENT DOCUMENTS

2007/0075548 A1 4/2007 Bagepalli et al.
2007/0265133 A1* 11/2007 Smook ................... 475/317
2010/0194114 A1 8/2010 Pechlivanoglou et al.

FOREIGN PATENT DOCUMENTS

| EP | 1251268 | 10/2002 |
| EP | 1 291 521 | 3/2003 |
| EP | 1445484 | 8/2004 |
| EP | 1457673 | 9/2004 |
| EP | 1489297 | 12/2004 |
| EP | 1855001 | 11/2007 |
| EP | 1867871 | 12/2007 |
| WO | WO 2005/028862 | 3/2005 |
| WO | WO 2006/000214 | 1/2006 |

OTHER PUBLICATIONS

International Preliminary Report on Patentability May 26, 2010.

* cited by examiner

DRIVE TRAIN FOR A WIND TURBINE

PRIORITY CLAIM

This is a U.S. national stage of application No. PCT/EP2008/067917, filed on Dec. 18, 2008. Priority is claimed on the following applications: Denmark Application No.: PA200701850 Filed on Dec. 21, 2007; U.S. Application No. 61/015,737 Filed on Dec. 21, 2007, the contents of which are incorporated here by reference.

FIELD OF THE INVENTION

The present invention relates to a drive train for a wind turbine. More particularly, the present invention relates to a drive train in which structural loads are transferred from a main bearing arrangement to a support structure of the wind turbine in a particularly advantageous and suitable manner.

BACKGROUND OF THE INVENTION

In wind turbines a hub is normally driven in a rotational manner due to the wind affecting a set of blades attached to the hub. This rotational movement is transferred to a generator via a drive train arranged inside a nacelle arranged on top of a tower construction. The drive train normally comprises a gear arrangement which increases the rotational speed of the hub to a speed which is suitable as an input for the generator. In some cases the drive train comprises a main shaft which transfers rotational movement from the hub to an input shaft of the gear arrangement. Such a main shaft is normally supported by a main bearing arrangement comprising one or more bearings, the main bearing arrangement being connected to a support structure of the wind turbine. The main bearing arrangement allows the main shaft to rotate relative to the support structure.

EP 1 457 673 discloses a drive train for a wind turbine comprising a hub, a rotor shaft, a main bearing, in the form of a locating bearing, and a shrinking washer, where axial forces of the rotor are absorbed in the main bearing of the rotor shaft. The main bearing comprises an outer raceway which is connected to a support structure, such as a base frame of a nacelle, of the wind turbine at bottom and top parts of the support structure. Thus, axial forces are transferred to the support structure via a connection between the outer raceway of the main bearing and the support structure, the connection being arranged substantially parallel to a rotational axis defined by the main shaft.

DESCRIPTION OF THE INVENTION

It is an object of the invention to provide a drive train for a wind turbine in which forces, in particular axial forces, can be transferred from a main bearing to a support structure of the wind turbine in a manner which is improved as compared to similar prior art drive trains.

It is a further object of the invention to provide a drive train for a wind turbine, the drive train having a design which is more service friendly than similar prior art drive train designs.

According to a first aspect of the invention the above and other objects are fulfilled by providing a drive train for a wind turbine, the drive train comprising:

a main shaft coupled, at a first end, to a hub of the wind turbine, said main shaft defining a rotational axis, a main bearing arrangement in the form of a single locating bearing arranged to support the main shaft, thereby providing a first support point for the main shaft, said main bearing arrangement comprising an inner raceway connected to the main shaft and an outer raceway coupled to a support structure of the wind turbine, and a gear arrangement coupled to the main shaft at a second end of the main shaft arranged opposite the first end, said gear arrangement providing a second support point for the main shaft, wherein the outer raceway of the main bearing arrangement is coupled to the support structure via a first flange part arranged on the outer raceway and a second flange part arranged on the support structure, said first and second flange parts defining interfacing surfaces extending in a plane which is arranged non-parallel to the rotational axis of the main shaft.

The main shaft is coupled to the hub at a first end and to the gear arrangement at a second, oppositely arranged, end. Accordingly, the main shaft transfers torque from the hub to the gear arrangement. The main shaft is adapted to rotate about its rotational axis, i.e. during operation it performs rotational movements relative to the wind turbine, in particular relative to a nacelle of the wind turbine. The main shaft rotates via the main bearing arrangement, which is arranged to support the main shaft.

The main bearing arrangement is in the form of a single locating bearing. Thus, the bearing is capable of transmitting axial loads from both directions, as well as radial loads, and the main bearing arrangement provides a first support point for the main shaft. The gear arrangement provides a second support point for the main shaft. The gear arrangement is preferably further suspended on the support structure, the suspension providing a third support point. Therefore the suspension of the main shaft described herein is sometimes referred to as a three-point suspension.

The main bearing arrangement comprises an inner raceway and an outer raceway having suitable bearing rollers arranged there between. The inner raceway is connected to the main shaft and the outer raceway is coupled to a support structure of the wind turbine, either directly or via one or more intermediate parts. Loads can be transferred from the bearing arrangement to the support structure via this coupling.

The outer raceway is coupled to the support structure via a first flange part arranged on the outer raceway and a second flange part arranged on the support structure. The first flange part may form part of the outer raceway and/or the second flange part may form part of the support structure. Alternatively, the first flange part and/or the second flange part may be formed on an intermediate part arranged between the outer raceway and the support structure.

The first and second flange parts extend in a plane which is arranged non-parallel to the rotational axis of the main shaft. Accordingly, loads are not transferred from the main bearing to the support structure along a direction which is perpendicular to the rotational axis, i.e. directly to a bottom part and/or a top part of the support structure. This is an advantage because it enables a particularly service friendly design of the drive train in which the main bearing and/or the main shaft can be repaired and/or replaced without having to remove the rotor from the nacelle of the wind turbine.

According to a preferred embodiment the interfacing surfaces of the first and second flange parts may extend in a plane which is arranged substantially perpendicularly to the rotational axis of the main shaft. According to this embodiment loads are transferred from the main bearing arrangement to the support structure in a direction which is substantially parallel to the rotational axis. This is particularly advantageous because it allows the design to be made even more service friendly, since it is even easier to repair and/or replace the main bearing and/or the main shaft without having to remove the rotor from the nacelle.

As an alternative, the interfacing surfaces of the first and second flange parts may extend in a plane which is arranged in such a manner that an acute angle is defined between the plane and the rotational axis.

The second flange part may be arranged at a position near the hub of the wind turbine. According to this embodiment, loads are transferred from the main bearing to the support structure at a position close to the hub, i.e. near the first end of the main shaft. The single locating bearing is preferably also arranged near the first end of the main shaft. Thereby the first support point and the second support point are arranged as far from each other as possible. This is an advantage because reaction forces on the bearings arising from the external loads acting on the blades of the wind turbine can thereby be reduced.

The support structure may be or comprise a base frame of a nacelle of the wind turbine. Alternatively, the support structure may be another kind of structure which is suitable for receiving loads from the main bearing.

The base frame may have a bell-like shape. Such a design is particularly well suited for transferring loads from the main bearing arrangement to a tower construction of the wind turbine in a lightweight design.

Alternatively or additionally, the base frame may be a cast structure comprising a machined flange arranged substantially perpendicular to the rotational axis of the main shaft, and the machined flange may be or form part of the second flange part. According to this embodiment the second flange part is machined directly on the base frame. Thereby the base frame and the second flange part can be manufactured in a very easy and cost effective manner.

The base frame may further comprise an additional machined flange arranged substantially parallel to a top part of a tower construction of the wind turbine. The additional machined flange may advantageously form part of a yawing system for the wind turbine.

The locating bearing may be a spherical roller bearing. Spherical roller bearings are particularly well suited to operate with angular misalignments, e.g. arising from main shaft deflection and/or from deformations from flexible support elements on the gearbox. As an alternative, the locating bearing may be a tapered roller bearing, e.g. having corrective grinding allowing for small angular misalignments, such as in the order of 0°-2°, between the main shaft and the support structure during operation of the wind turbine. Alternatively, any other suitable kind of locating bearing may be used.

The second end of the main shaft may be coupled to the gear arrangement via a first flange arranged on the main shaft and a second flange arranged on a part of the gear arrangement. This construction allows the main shaft and the gear arrangement to be detached from each other in a simple and easy manner. This is very advantageous in the case that it is necessary to remove the gear arrangement due to maintenance or replacement.

The first flange and the second flange may be bolted together. According to this embodiment, torsion is transferred from the main shaft to the gear arrangement via the bolts by means of friction between the flanges. The connection may further comprise one or more shear pins. In this case the torsion is primarily transferred by means of the shear pins, and other forces and moments are transferred by means of the bolt connections. Alternatively, the flanges may be coupled together by other means, e.g. a bushing.

The first flange may be an add-on flange attached to the main shaft and/or the second flange may be an add-on flange attached to a part of the gear arrangement. Using add-on flanges allows bearings to be slid onto the main shaft and/or an input shaft of the gear arrangement prior to attaching the add-on flanges. Thereby the assembly of the drive train can be performed in an easy manner. Both of the flanges may be add-on flanges, or one of the flanges may be an add-on flange while the other forms an integrated part of the main shaft/gear part.

The first add-on flange and/or the second add-on flange may be attached to the main shaft/gear arrangement by means of one or more pin bolts. This enables a very compact design of the flange coupling. However, it requires particular attention to production tolerances. In a preferred embodiment the first add-on flange is connected to the main shaft by means of pins, and it is machined together with the main shaft in order to control the production tolerances. Similarly, the second add-on flange is connected to a part of the gear arrangement, e.g. an input gear shaft, by means of pins, and it is machined together with the gear arrangement. Between the first add-on flange and the second add-on flange torque is transferred due to friction between the flanges, thereby reducing the requirements for very accurate production tolerances The first flange may be provided with a first positive engaging structure and the second flange may be provided with a second positive engaging structure, said first and second engaging structures being adapted to engage. According to this embodiment torque is transferred between the flanges by means of the first and second engaging structures. Thereby it can be ensured that large torque loads can be transferred at all times substantially without wearing the coupling between the main shaft and the gear arrangement.

The first and second positive engaging structures may comprise alternating bulges and recesses. According to this embodiment, bulges formed on one flange are adapted to engage recesses formed on the other flange. Bulges, e.g. in the form of teeth, pins, knobs or any other suitable kind of protuberance, formed on the flanges increases the ability of the flanges to transfer torque. When the bulges and recesses engage, the risk of the coupling slipping is highly reduced, and reliable torque transfer is ensured.

According to one embodiment, the first and second positive engaging structures may comprise meshing substantially radial extending teeth.

The second end of the main shaft may be connected to a planet carrier of the gear arrangement. This may be obtained by means of flange connections as described above. Alternatively, the second end of the main shaft may be connected to the planet carrier in another suitable manner, such as by means of a shrink disc.

The drive train may further comprise means for temporarily fixing the hub of the wind turbine to the support structure. This is particularly desirable in the case that it is necessary to remove the main bearing arrangement, e.g. due to maintenance or replacement of the main bearing arrangement. In the drive train of the present invention the coupling between the outer raceway of the main bearing arrangement and the support structure plays a very important part in the support of the main shaft. Accordingly, when this coupling is interrupted due to removal of the main bearing arrangement during maintenance or replacement, there is a risk that the main shaft is misaligned. In this case it is necessary to realign the main shaft after the main bearing has been repaired or replaced. However, by providing means for temporarily fixing the hub to the support structure, such a temporary coupling can keep the main shaft in an aligned position until the main bearing has been properly attached again. Thereby a cumbersome realignment of the main shaft can be avoided.

The means for temporarily fixing the hub to the support structure may comprise one or more bolts. Alternatively, other suitable fixing means may be used.

The second support point may be provided by means of a bearing arrangement arranged inside the gear arrangement.

The invention further relates to a wind turbine comprising a tower construction, a nacelle, a hub carrying a set of blades and a drive train according to the first aspect of the invention.

According to a second aspect of the invention the above and other objects are fulfilled by providing a method of performing service on a drive train for a wind turbine, the drive train comprising a hub, a gear arrangement, a main shaft coupled to the hub at a first end and to the gear arrangement at a second end, and a main bearing arrangement arranged to support the main shaft, said main bearing arrangement being connected to a support structure of the wind turbine, the method comprising the steps of:

fixing the hub to the support structure,
performing service on one or more parts of the drive train, and
releasing the hub and the support structure.

As described above, fixing the hub to the support structure during service or maintenance of one or more parts of the drive train makes it possible to ensure that the main shaft stays aligned while the service is performed. The method is particularly suitable for performing service on the main bearing arrangement, such as maintenance or replacement of the main bearing arrangement. However, it may also be suitable when performing service on other parts of the drive train, e.g. the gear arrangement.

It should be noted that a person skilled in the art would readily recognise that any feature described in combination with the first aspect of the invention could also be combined with the second aspect of the invention, and vice versa.

The method may further comprise the step of releasing the connection between the main bearing arrangement and the support structure prior to the step of performing service.

The drive train may advantageously be a drive train according to the first aspect of the invention.

Alternatively, the drive train may be of a kind, wherein the main bearing arrangement of the drive train comprises a front bearing and a rear bearing, each being arranged to support the main shaft, thereby providing a first and a second support point for the main shaft, said bearings each comprising an inner raceway connected to the main shaft and an outer raceway coupled to the support structure, and wherein the outer raceway of the front bearing is coupled to the support structure via a first flange part arranged on the outer raceway of the front bearing and a second flange part arranged on the support structure, said first and second flange parts defining interfacing surfaces extending in a plane which is arranged non-parallel to the rotational axis of the main shaft.

A suspension of the main shaft as described above, using a front bearing and a rear bearing, is sometimes referred to as a four-point suspension. The front bearing is coupled to the support structure in the manner described above with reference to the first aspect of the invention. The rear bearing may also be coupled to the support structure in this manner. Alternatively, it may be coupled to the support structure directly to a bottom part and/or a top part of the support structure. One of the front bearing and the rear bearing may be a locating bearing, while the other is a floating bearing. Preferably, the rear bearing is a locating bearing, since, in most cases, the rear bearing is the one with the smallest radial loads.

Thus, it is noted that it could be suitable or desirable to use the method according to the second aspect of the invention in a wind turbine having a drive train in which a main shaft is suspended by means of a four-point suspension. As mentioned above, it is thereby obtained that the main shaft stays aligned during maintenance or replacement of major parts of the drive train, in particular the front bearing. In addition to this, the design enables replacement of the main shaft and main bearings without having to remove the wind turbine rotor from the nacelle.

BRIEF DESCRIPTION OF THE DRAWINGS

The invention will now be described in further detail with reference to the accompanying drawings in which.

DETAILED DESCRIPTION OF THE DRAWINGS

Figure 1:
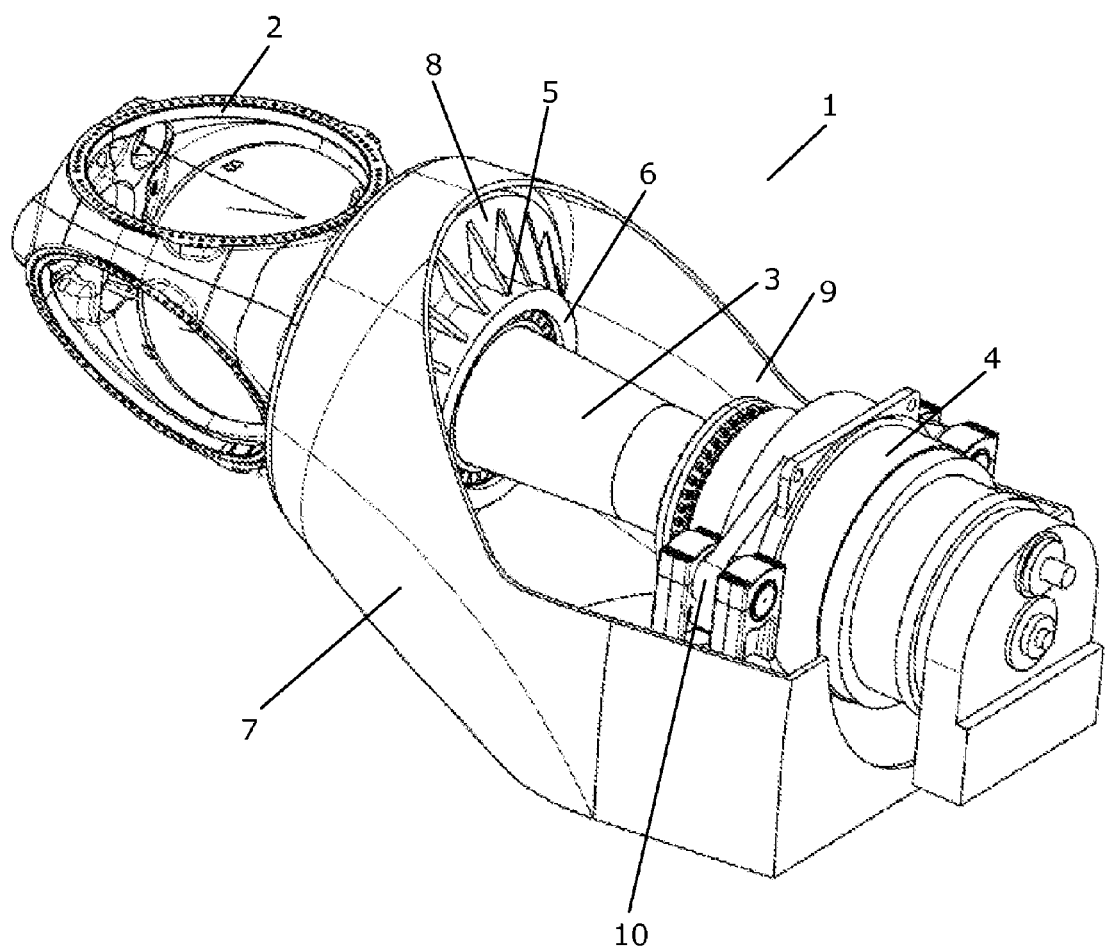
FIG. 1 is a perspective view of a drive train according to an embodiment of the invention.

FIG. 1 is a perspective view of a drive train 1 according to an embodiment of the invention. The drive train 1 comprises a hub 2 adapted to have three blades mounted thereon, a main shaft 3, a gear arrangement 4 and a main bearing arrangement 5. The main bearing arrangement 5 is arranged to support the main shaft 3 in such a manner that the main shaft 3 is rotatable relative to the main bearing arrangement 5.

The main bearing arrangement 5 comprises an outer raceway 6 which is connected to a support structure in the form of a base frame 7 via a first flange part 8. This will be described further below with reference to FIG. 2.

The main shaft 3 is coupled to the hub 2 at a first end and to the gear arrangement 4 at a second end. Thus, during operation, the main shaft 3 transfers torque from the hub 2 to the gear arrangement 4. The main shaft 3 and the gear arrangement 4 are attached to each other via a flange coupling 9. This will be described further below with reference to FIG. 3.

Figure 3:
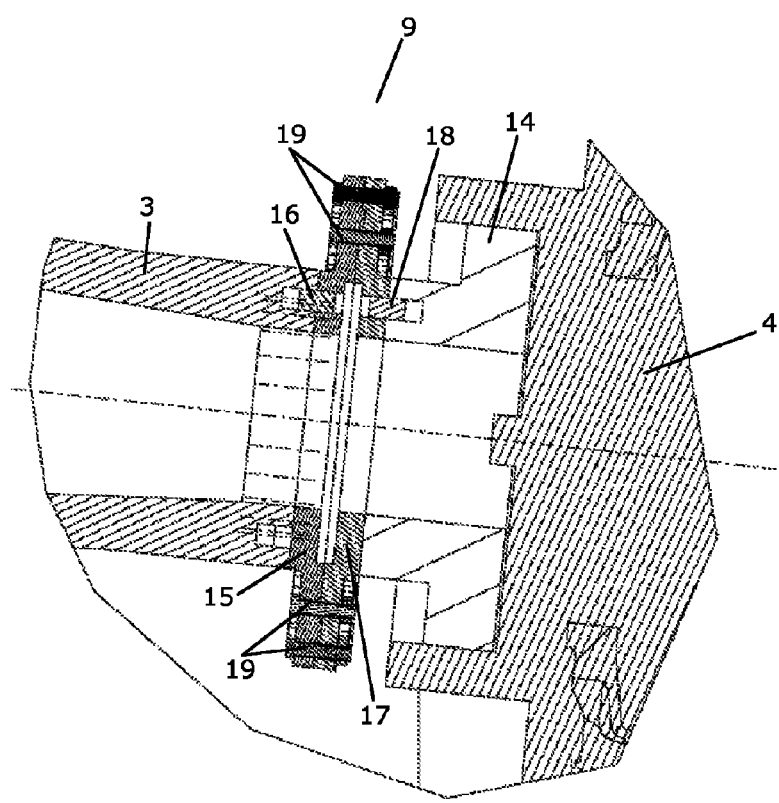
FIG. 3 is a detail of the drive train of FIGS. 1 and 2 showing a coupling between the main shaft and an input shaft of the gear arrangement.

The gear arrangement 4 is coupled to the base frame 7 via suspension 10. Thereby the main shaft 3 is supported by the main bearing arrangement 5, a bearing (not visible) arranged inside the gear arrangement 4 and the suspension 10 of the gear arrangement 4. Therefore the suspension of the main shaft 3 shown in FIG. 3 is sometimes referred to as a 'three-point suspension'.

Figure 2:
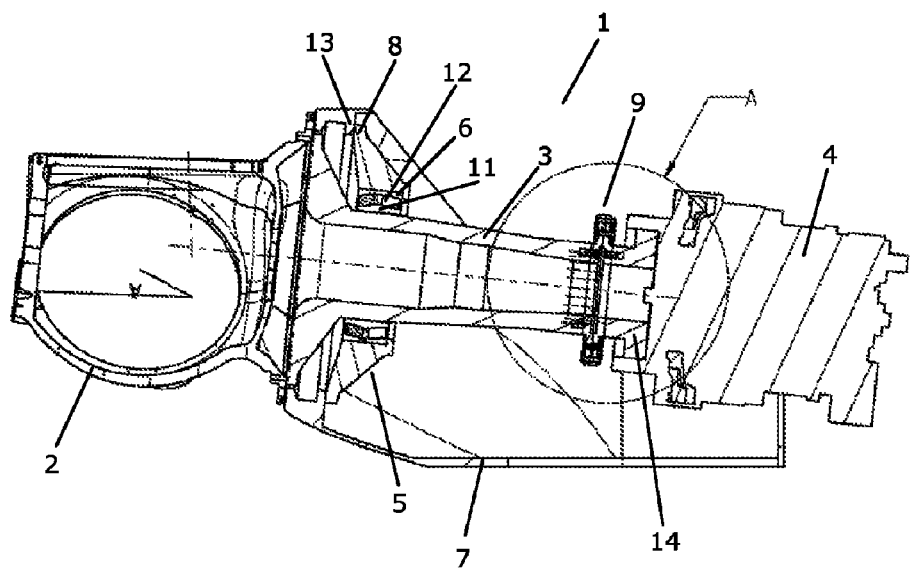
FIG. 2 is a cross sectional view of the drive train of FIG. 1.

FIG. 2 is a cross sectional view of the drive train 1 of FIG. 1. In FIG. 2 it can be seen that the main bearing arrangement 5 is a spherical roller bearing with an inner raceway 11, an outer raceway 6 and a plurality of rollers 12 arranged there between. The outer raceway 6 is connected to the first flange part 8 which is coupled to a second flange part 13 formed on the support structure 7. The flange parts 8, 13 interface along a plane which is arranged substantially perpendicularly to the rotational axis of the main shaft 3. Accordingly, loads are transferred from the main bearing arrangement 5 to the support structure 7 along a direction which is substantially parallel to the rotational axis of the main shaft 3. This design is particularly service friendly, allowing the main bearing arrangement 5 and the main shaft 3 to be repaired or replaced without having to remove the hub 2.

Removing the main bearing arrangement 5 of the drive train 1 of FIGS. 1 and 2 introduces the risk that the main shaft 3 is misaligned, because the main bearing arrangement 5 forms a substantial part of the support of the main shaft 3. However, the design of the shown drive train 1 allows the hub 2 to be temporarily fixed to the support structure 7, and thereby the main bearing arrangement 5 can be safely removed for the purpose of maintenance or replacement without risking misalignment of the main shaft 3.

It further appears from FIG. 2 that the coupling 9 connects the main shaft 3 with an input shaft 14 of the gear arrangement 4.

FIG. 3 shows a detail of FIG. 2, showing the coupling 9 between the main shaft 3 and the input shaft 14 of the gear arrangement 4. The coupling 9 comprises a first add-on flange 15 attached to the main shaft 3 via a plurality of pin bolts 16 and a second add-on flange 17 attached to the input shaft 14 of the gear arrangement 4 via a plurality of pin bolts 18. The first add-on flange 15 and the second add-on flange 17 are coupled together by means of a plurality of bolts 19. The bolts 19 ensure that the add-on flanges 15, 17 remain in contact, and torque is transferred from the first add-on flange 15 to the second add-on flange 17 due to friction between the flanges 15, 17 during operation.

Figure 4:
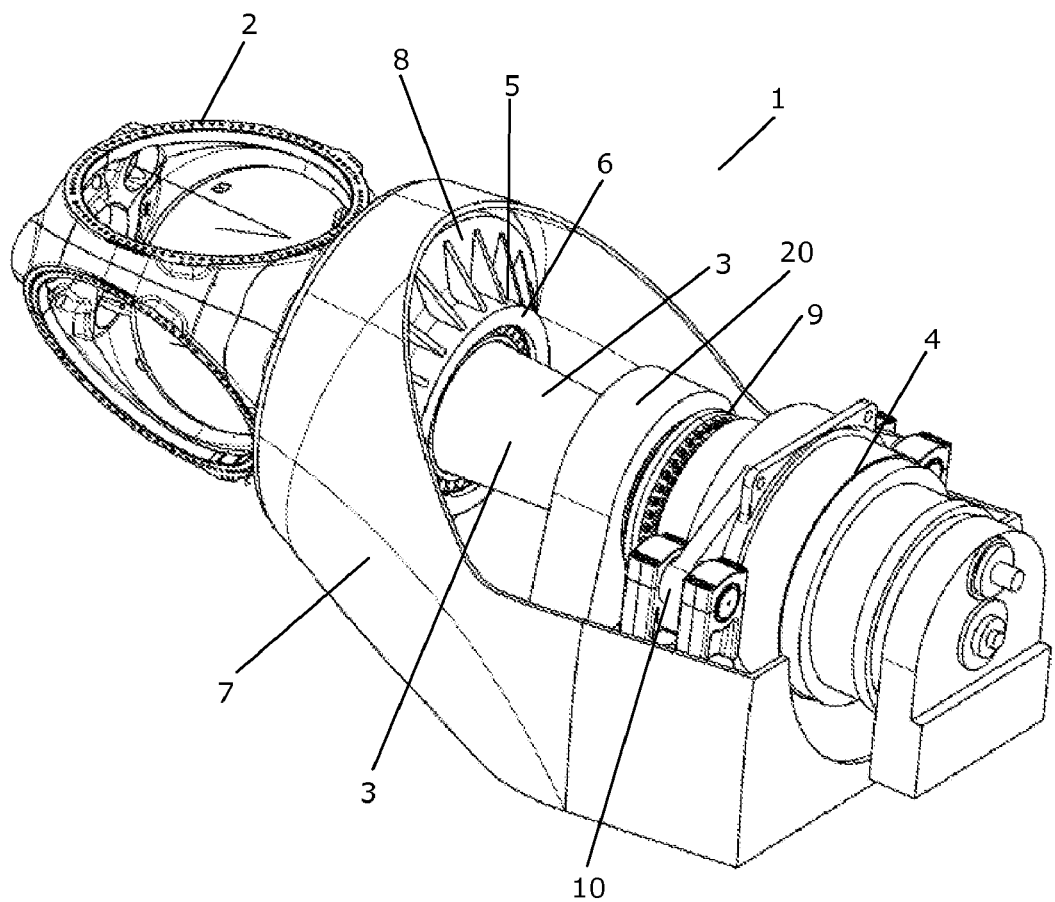
FIG. 4 is a perspective view of a drive train on which a method according to an embodiment of the invention can be performed.

FIG. 4 is a perspective view of a drive train 1 on which a method according to an embodiment of the invention can be performed. The drive train 1 is similar to the one shown in FIGS. 1 and 2. However, the drive train 1 of FIG. 4 comprises a front bearing 5 arranged to support the main shaft 3 at a position near the hub 2, and a rear bearing 20 arranged to support the main shaft 3 at a position near the gear arrangement 4. The front bearing 5 is coupled to the support structure 7 in the manner described above with reference to FIGS. 1 and 2. The rear bearing 20 is coupled to the support structure 7 via a bottom part of the support structure 7.

Even though the drive train 1 of FIG. 4 comprises an additional rear bearing 20 as compared to the drive train of FIGS. 1 and 2, there is still a risk that the main shaft 3 is misaligned if the coupling between the flanges 8 and 13 is interrupted, e.g. in order to repair or replace the front bearing 5. Furthermore, it may be desirable or necessary to remove the rear bearing 20 as well as the front bearing 5. It is therefore an advantage that the design of the shown drive train 1 allows the hub 2 to be temporarily fixed to the support structure 7, and thereby the front bearing 5, and possibly also the rear bearing 20, can be safely removed for the purpose of maintenance or replacement without risking misalignment of the main shaft 3.

Figure 5:
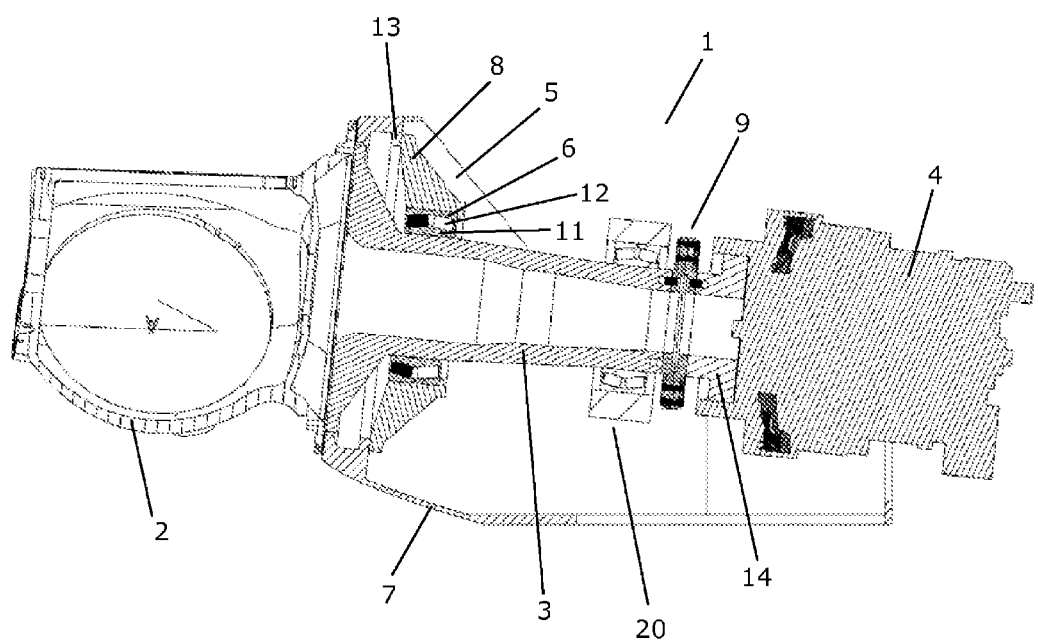
FIG. 5 is a cross sectional view of the drive train of FIG. 4.

FIG. 5 is a cross sectional view of the drive train 1 of FIG. 4. In FIG. 5 the position of the front bearing 5 and the rear bearing 20 can clearly be seen.

The invention claimed is:

1. A drive train for a wind turbine, the drive train comprising:
    a main shaft coupled, at a first end, to a hub of the wind turbine, said main shaft defining a rotational axis,
    a main bearing arrangement in the form of a single locating bearing arranged to support the main shaft, thereby providing a first support point for the main shaft, said main bearing arrangement comprising an inner raceway connected to the main shaft and an outer raceway coupled to a support structure of the wind turbine, and
    a gear arrangement coupled to the main shaft at a second end of the main shaft arranged opposite the first end, said gear arrangement providing a second support point for the main shaft,
wherein the outer raceway of the main bearing arrangement is coupled to the support structure via a first flange part arranged on the outer raceway and a second flange part arranged on the support structure, said first and second flange parts defining interfacing surfaces extending in a plane which is arranged non-parallel to the rotational axis of the main shaft, and wherein the drive train further comprises means for temporarily fixing the hub of the wind turbine to the support structure.

2. The drive train according to claim 1, wherein the interfacing surfaces of the first and second flange parts extend in a plane which is arranged substantially perpendicularly to the rotational axis of the main shaft.

3. The drive train according to claim 1, wherein the second flange part is arranged at a position near the hub of the wind turbine.

4. The drive train according to claim 1, wherein the support structure is or comprises a base frame of a nacelle of the wind turbine.

5. The drive train according to claim 4, wherein the base frame has a bell-like shape.

6. The drive train according to claim 4, wherein the base frame is a cast structure comprising a machined flange arranged substantially perpendicular to the rotational axis of the main shaft, said machined flange being or forming part of the second flange part.

7. The drive train according to claim 6, wherein the base frame further comprises an additional machined flange arranged substantially parallel to a top part of a tower construction of the wind turbine.

8. The drive train according to claim 1, wherein the locating bearing is a spherical roller bearing.

9. The drive train according to claim 1, wherein the locating bearing is a tapered roller bearing.

10. The drive train according to claim 1, wherein the second end of the main shaft is coupled to the gear arrangement via a first flange arranged at the main shaft and a second flange arranged on a part of the gear arrangement.

11. The drive train according to claim 10, wherein the first flange and the second flange are bolted together.

12. The drive train according to claim 10, wherein the first flange is an add-on flange attached to the main shaft and/or the second flange is an add-on flange attached to a part of the gear arrangement.

13. The drive train according to claim 12, wherein the first add-on flange and/or the second add-on flange is/are attached to the main shaft/gear arrangement by means of one or more pin bolts.

14. The drive train according to claim 10, wherein the first flange is provided with a first positive engaging structure and the second flange is provided with a second positive engaging structure, said first and second engaging structures being adapted to engage.

15. The drive train according to claim 14, wherein the first and second positive engaging structures comprise alternating bulges and recesses.

16. The drive train according to claim 14, wherein the first and second positive engaging structures comprise meshing substantially radial extending teeth.

17. The drive train according to claim 1, wherein the second end of the main shaft is connected to a planet carrier of the gear arrangement.

18. The drive train according to claim 1, wherein the means for temporarily fixing the hub to the support structure comprises one or more bolts.

19. The drive train according to claim 1, wherein the second support point is provided by means of a bearing arrangement arranged inside the gear arrangement.

20. A wind turbine comprising a tower construction, a nacelle, a hub carrying a set of blades and a drive train according to claim 1.

21. A method of performing service on a drive train for a wind turbine, the drive train comprising a hub, a gear arrangement, a main shaft coupled to the hub at a first end and to the gear arrangement at a second end, and a main bearing arrangement arranged to support the main shaft, said main bearing arrangement being connected to a support structure of the wind turbine, the method comprising the steps of:

fixing the hub to the support structure, performing service on one or more parts of the drive train, and releasing the hub and the support structure.

22. The method according to claim 21, further comprising the step of releasing the connection between the main bearing arrangement and the support structure prior to the step of performing service.

23. The method according to claim 21, wherein the main bearing arrangement of the drive train comprises a front bearing and a rear bearing, each being arranged to support the main shaft, thereby providing a first and a second support point for the main shaft, said bearings each comprising an inner raceway connected to the main shaft and an outer raceway coupled to the support structure, and wherein the outer raceway of the front bearing is coupled to the support structure via a first flange part arranged on the outer raceway of the front bearing and a second flange part arranged on the support structure, said first and second flange parts defining interfacing surfaces extending in a plane which is arranged non-parallel to the rotational axis of the main shaft.

* * * * *